April 28, 1953 H. GANG 2,636,677
OPERATION CONTROL MEANS FOR CALCULATING MACHINES
Filed June 24, 1950 10 Sheets-Sheet 1

Inventor
HERMAN GANG
By George V. Hall
Attorney

Inventor
HERMAN GANG
By George V. Hall
Attorney

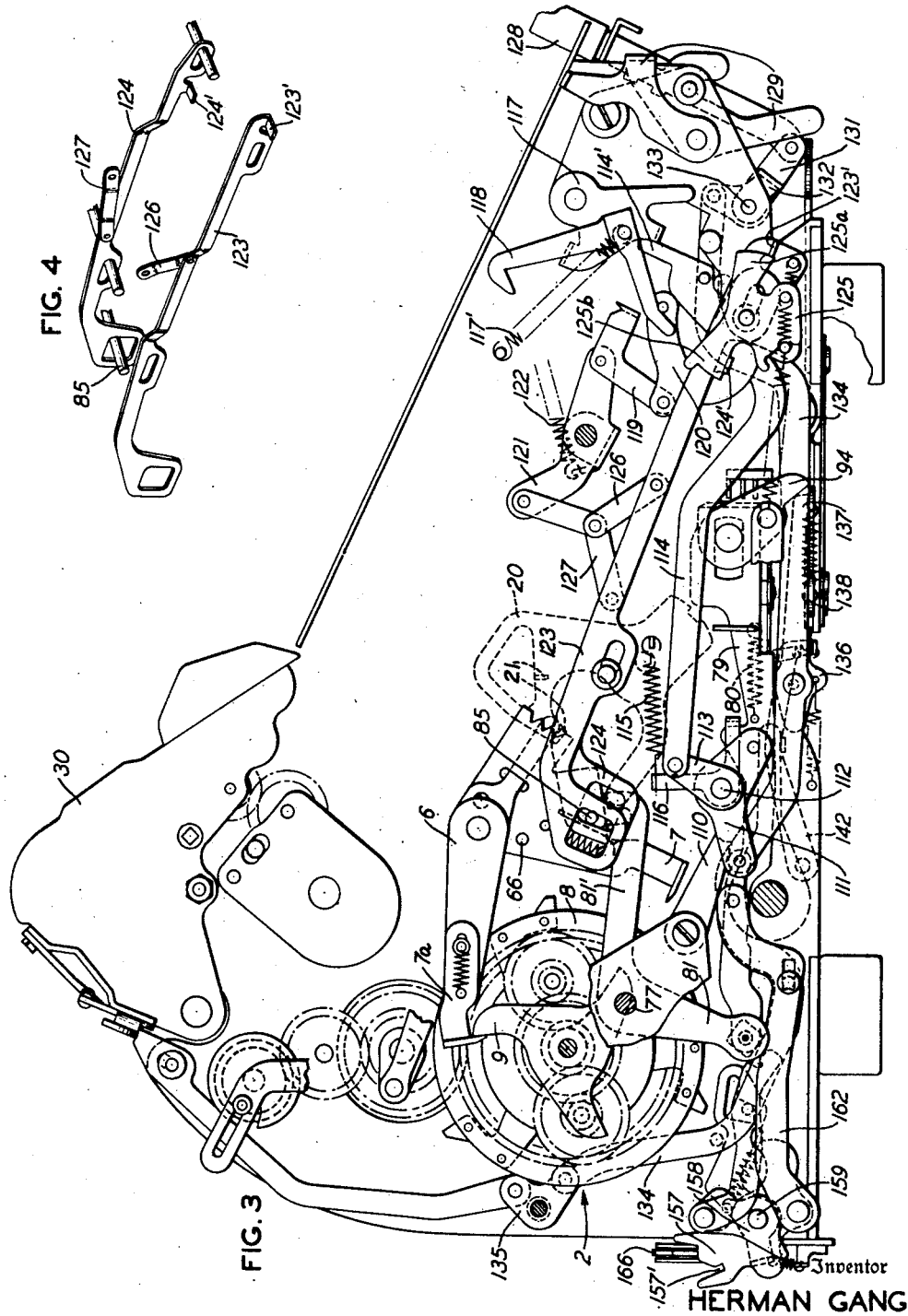

April 28, 1953  H. GANG  2,636,677
OPERATION CONTROL MEANS FOR CALCULATING MACHINES
Filed June 24, 1950  10 Sheets-Sheet 4

INVENTOR
HERMAN GANG
BY
*George V. Hall*
ATTORNEY

April 28, 1953    H. GANG    2,636,677
OPERATION CONTROL MEANS FOR CALCULATING MACHINES
Filed June 24, 1950    10 Sheets-Sheet 5

Inventor
HERMAN GANG
By George V. Hall
Attorney

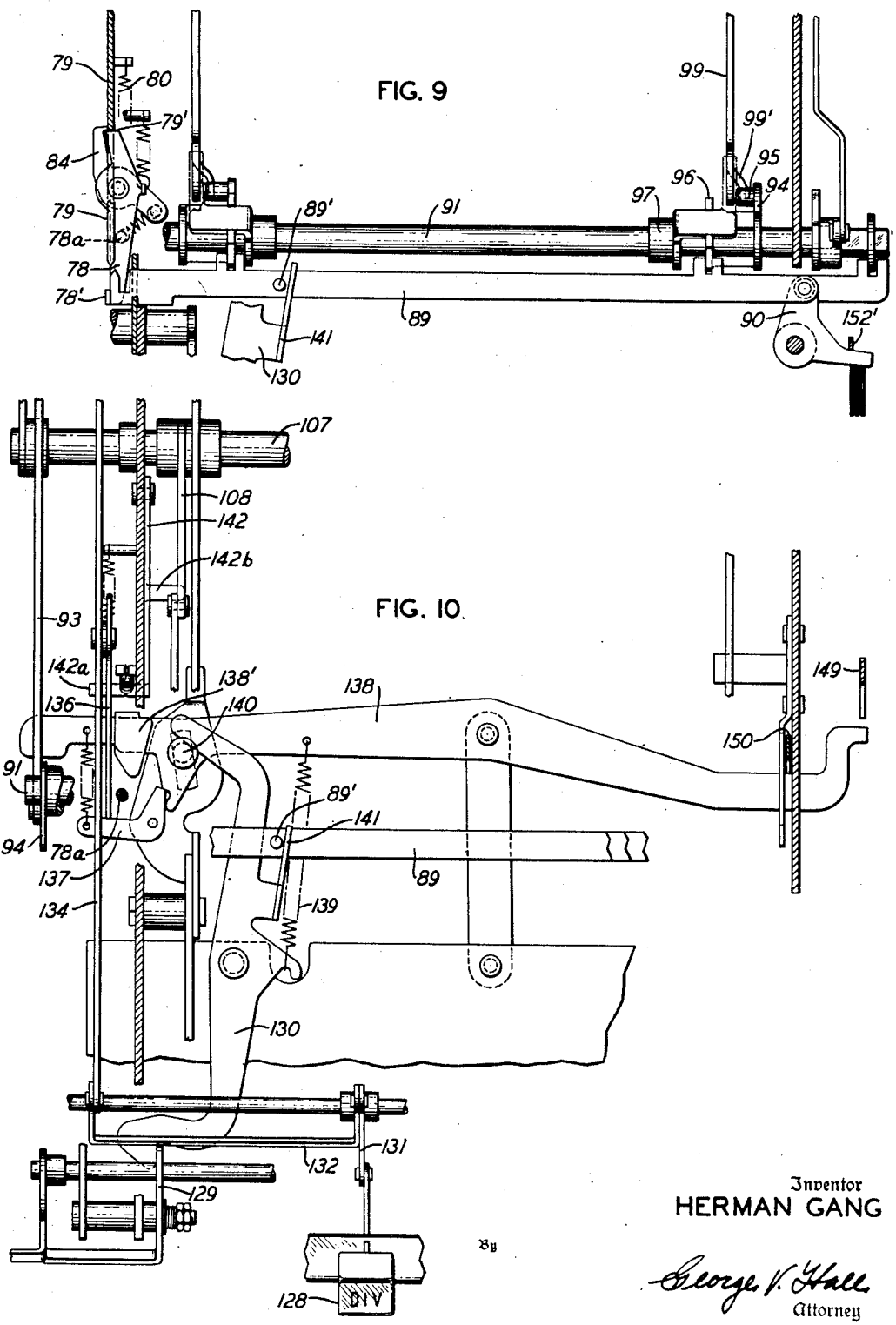

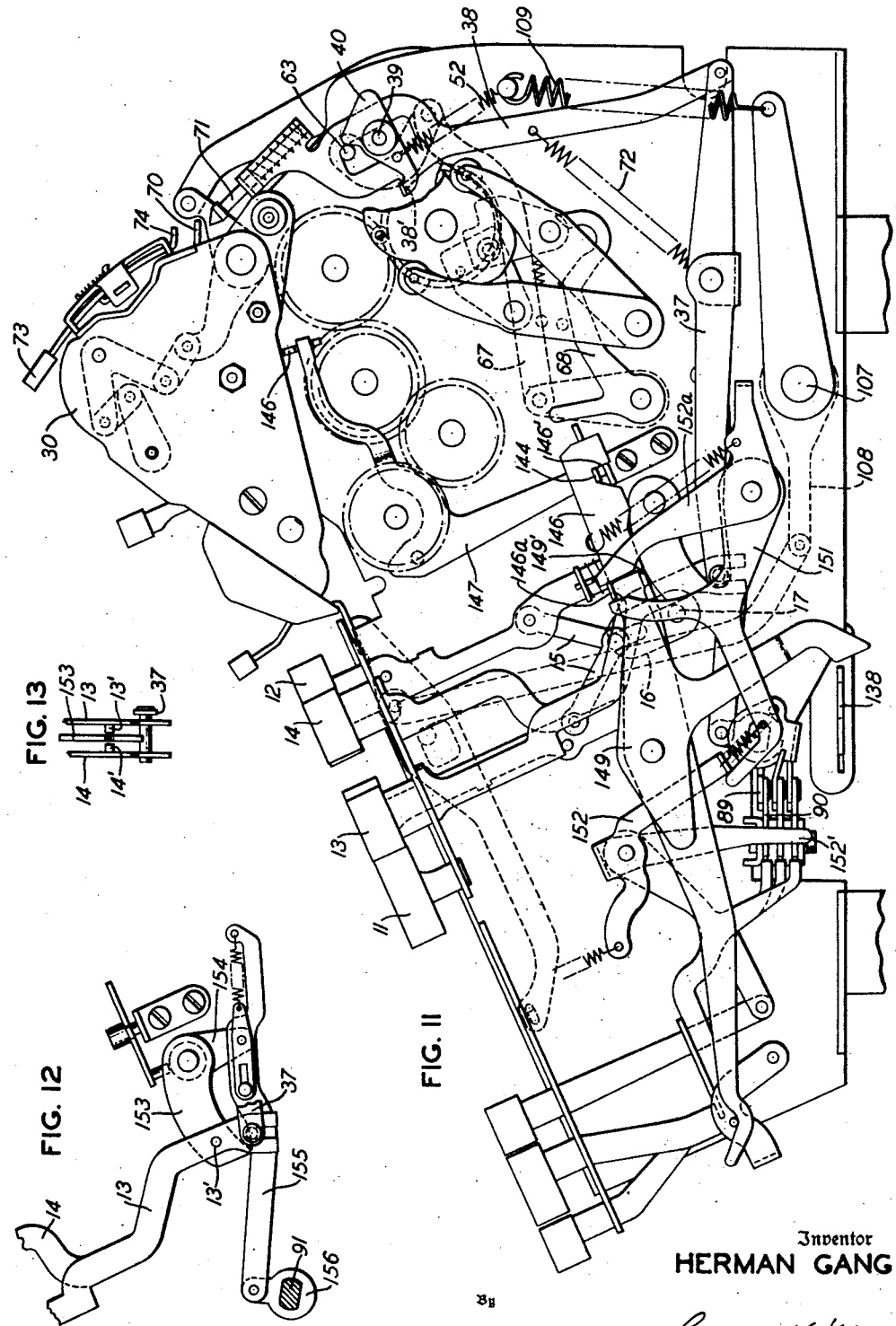

Inventor
HERMAN GANG
George V. Hall
Attorney

April 28, 1953 H. GANG 2,636,677
OPERATION CONTROL MEANS FOR CALCULATING MACHINES
Filed June 24, 1950 10 Sheets-Sheet 9

Inventor
HERMAN GANG
By
George V. Hall
Attorney

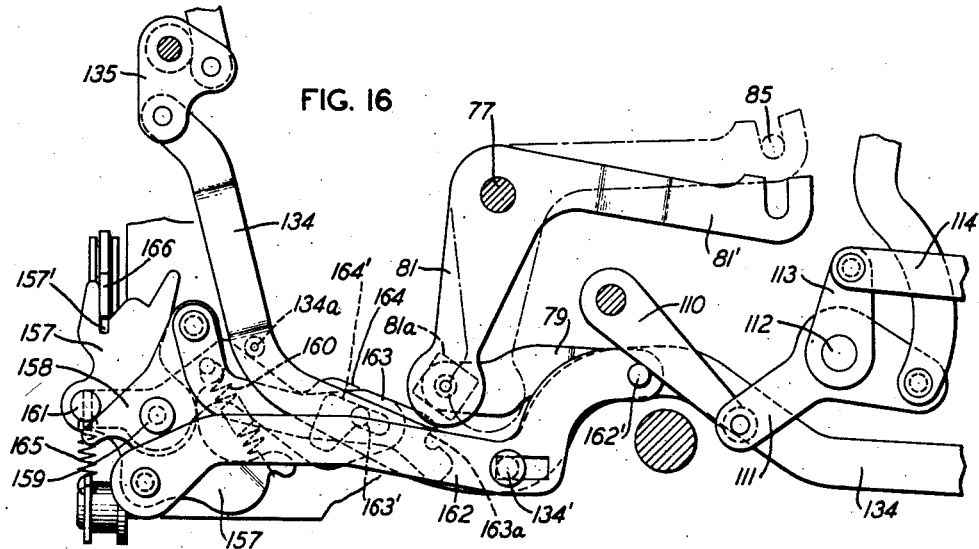
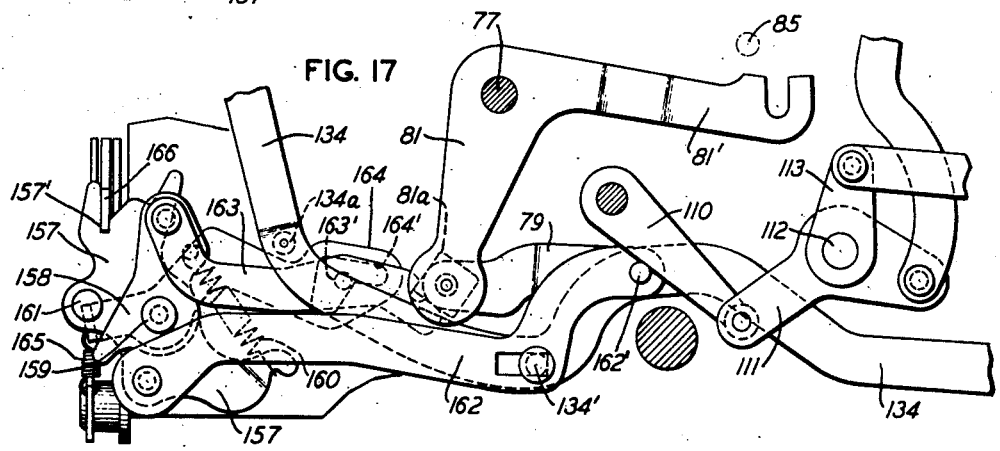
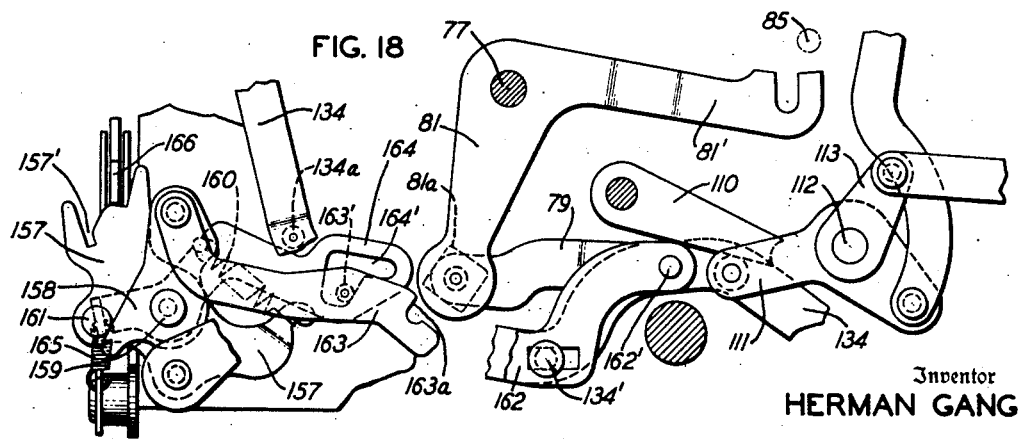

Patented Apr. 28, 1953

2,636,677

UNITED STATES PATENT OFFICE 2,636,677

OPERATION CONTROL MEANS FOR CALCULATING MACHINES

Herman Gang, Livingston, N. J., assignor to Monroe Calculating Machine Company, Orange, N. J., a corporation of Delaware Application June 24, 1950, Serial No. 170,199

12 Claims. (Cl. 235—62)

The invention relates to operation control means for calculating machines and the like and particularly to an improved arrangement for controlling the operation of a plurality of clutch driven mechanisms. More specifically, the invention relates to such control means wherein the position of a shiftable register carriage operates to disable or alternatively enable mechanism for shifting the carriage in sequential relation with a plurality of other sequentially operable clutch driven mechanisms upon manipulation of an operating member, such as a key.

The present invention is particularly applicable to control calculating machine operations wherein one or more ancillary operations are necessary or desirable before the initiation of the main operation.

For example, in an automatic division operation, it is often necessary to clear the multiplier quotient register before initiating the operation. Also, in many instances, before instituting the division operation it is necessary to shift the register carriage to properly align the dividend set in the product-dividend register with the divisor set in the keyboard.

The aforenoted ancillary operations in conjunction with the institution of the division operation are controlled by the devices of the present invention upon operation of an auxiliary clutch which is engaged upon depression of an operating key.

The auxiliary clutch is adapted to clear the multiplier quotient register and then, if the register carriage is in its rightmost position, to engage the main clutch to initiate the division operation. If, however, the register carriage is out of its rightmost position, a rightward carriage shift will be interposed between the clearing operation and the engagement of the main clutch. The carriage shift will be terminated upon movement of the carriage to its rightmost position or to a position indicated by a set tabulating stop to properly locate the dividend with relation to the divisor set in the keyboard. Should the carriage be shifted too far to the right, the subsequent division operation will shift the carriage toward the left without effective registration in the quotient register until the dividend is properly aligned with the divisor.

The invention has been disclosed as controlling certain ancillary operations in conjunction with the institution of a division operation in a calculating machine constructed and operating in accordance with the disclosure of applicant's copending application, Serial No. 8,548, now Patent 2,531,207. It will be understood, however, that the invention is equally applicable to other types of calculating machines having a plurality of clutch driven mechanisms wherein it is desired to effect and control their sequential operation. Therefore, it will be apparent that the particular operations performed by the clutch mechanisms are incidental to the operation of the devices of the invention and that the invention resides in means for controlling the initiation of the operations. For subject matter herein disclosed but not claimed, reference is made to applicant's copending applications, Ser. Nos. 8,544, now Patent 2,531,204, 8,547, now Patent 2,531,206 and 8,548, now Patent 2,531,207, wherein such matter is claimed.

The invention, however, will best be understood from the following description when read in conjunction with the accompanying drawings in which:

Fig. 3 is a left side view of the machine showing the main clutch engaging means in operated position subsequent to operation of the auxiliary clutch;

Fig. 4 is an exploded perspective view of the main clutch direction control slides;

Fig. 9 is a fragmentary plan view of parts of the auxiliary clutch and the register clearing control means;

Fig. 10 is a fragmentary plan view of devices of the invention operable to engage the auxiliary clutch, and to engage the register clearing train;

Fig. 11 is a right side view of the machine showing the carriage shift control means related to devices of the invention;

Fig. 12 is a fragmentary right side view of the carriage shift key stems and means operable to depress the keys;

Fig. 13 is a detailed view of parts shown in Fig. 12 as viewed from the left;

Fig. 16 is a left side detailed view of devices of the invention operable by the auxiliary clutch to engage the main clutch and showing the parts in normal position;

Fig. 17 is a view similar to Fig. 16 showing the parts in an intermediately operated position; and Fig. 18 is also a view similar to Fig. 16 showing the parts in full operated position.

Main clutch mechanism

Figure 6:
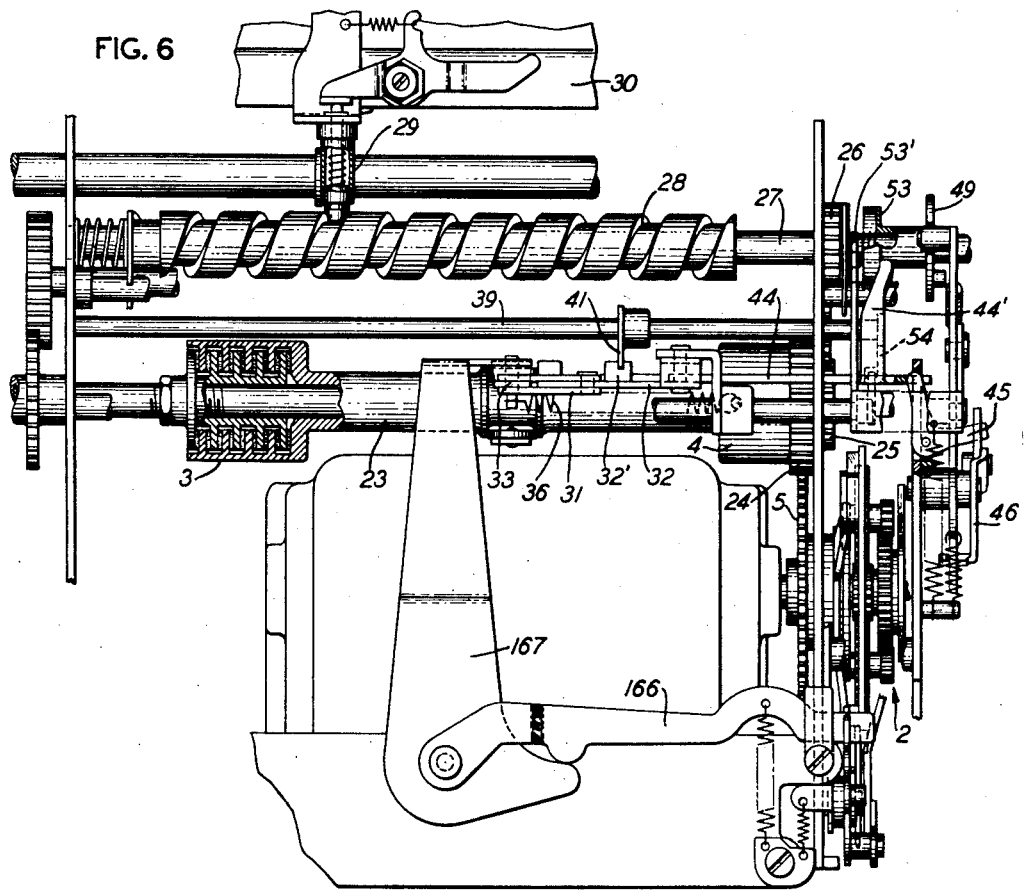
Fig. 6 is a fragmentary rear view of the machine showing portions of the carriage shifting mechanism and devices of the invention associated therewith.

The registering and carriage shifting operations of the machine disclosed in my aforenoted copending application, Serial No. 8,548, now Patent 2,531,207, and to which the invention is shown applied, are performed by power transmitted from a motor 1 (Fig. 14) through a common main differential clutch mechanism 2 (Figs. 3 and 6).

The registering mechanism is connected to the differential clutch mechanism 2 by a normally engaged friction clutch 3 and alternatively the carriage shifting mechanism is connected by engagement of a normally disengaged friction clutch 4 which is engaged upon disengagement of the registration clutch.

Figure 5:
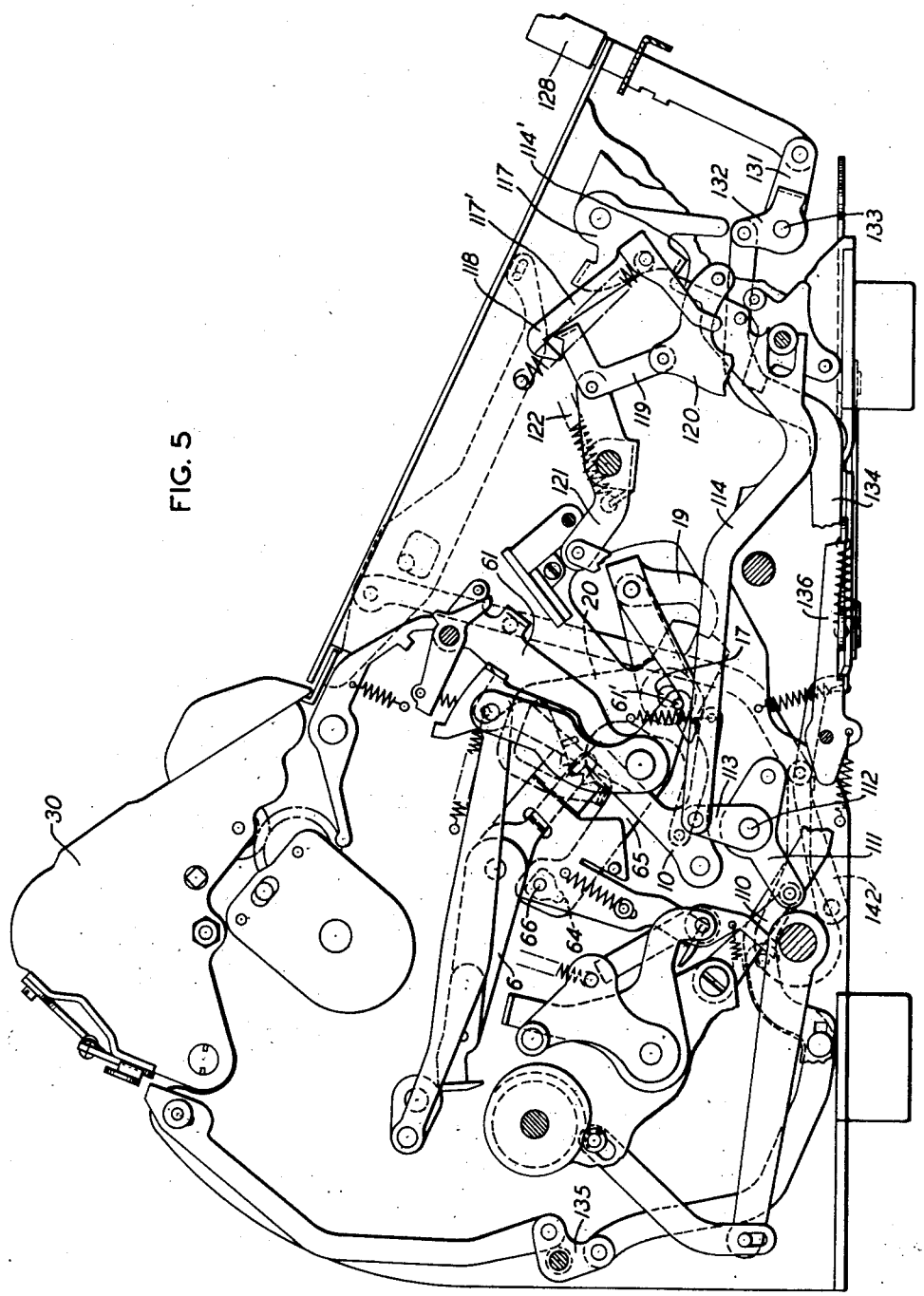
Fig. 5 is a left side view of the machine showing in detail certain mechanisms associated with the invention.

The differential clutch mechanism 2 is constructed substantially in accordance with the disclosure of U. S. Patent 1,566,650, issued on December 22, 1925, to George C. Chase. Normally, the gearing comprising both working legs of the differential drive rotate idly as described in the aforenoted patent; interruption of the movement of one leg causing the planet gears to move in their orbit in one direction accordingly rotating output gear 5 (Fig. 6) and interruption of the movement of the other leg causing rotation in the reverse direction. The working legs of the differential drive are selectively arrested by means of a clutch lever 6 (Figs. 3 and 5) fulcrumed at the machine left side frame and adjustable to neutral, additive, or subtractive setting. A click pawl 10 holds clutch lever 6 in its adjusted positions. The two active settings provide for additive and subtractive registration or, alternatively, for right and left carriage shift respectively. Clockwise movement of lever 6 positions it to additive setting whereby a hook arm 7 (Fig. 3) of said lever will engage a lug on gear 8 forming one leg of the differential drive to interrupt its movement, thereby causing rotation of output gear 5. Conversely, counterclockwise movement positions lever 6 to subtractive setting whereby a hook arm 7a thereof will engage a stop 9 of the other leg of the differential to interrupt its movement and cause rotation of output gear 5 in the reverse direction.

Carriage shifting mechanism

The devices of the invention concern the registering mechanism only in the control of the engagement of main clutch 2 to initiate its operation. Therefore, the operations performed by main clutch 2 will be considered only in connection with the carriage shifting mechanism which operates in conjunction with the devices of the invention.

Figure 1:
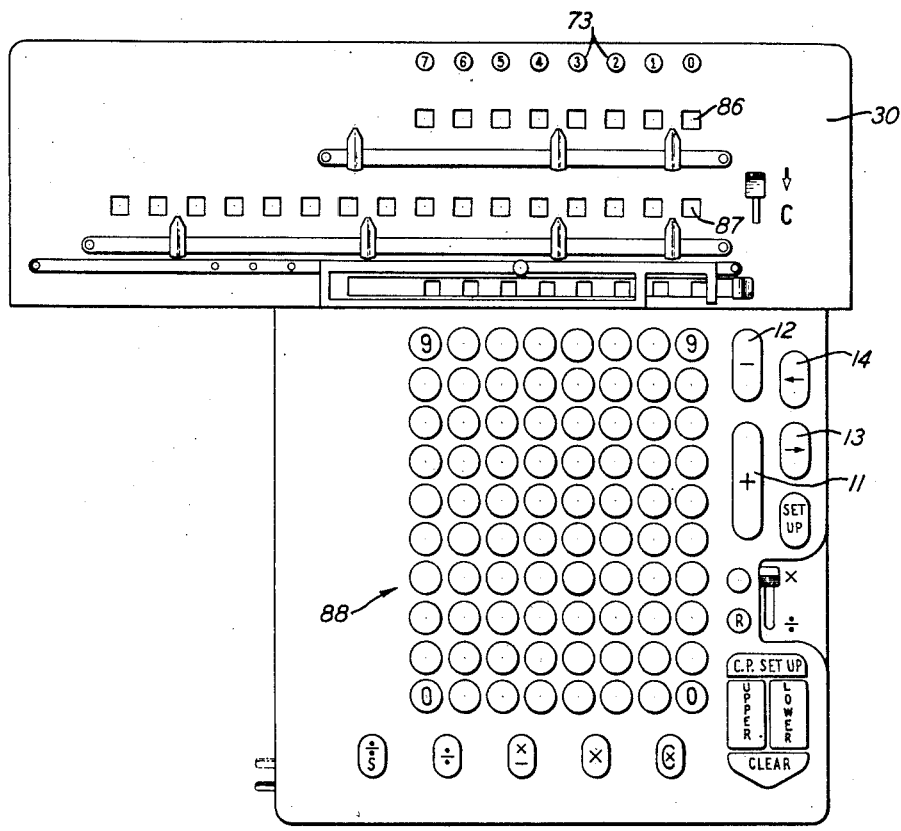
Fig. 1 is a plan view of a calculating machine embodying the invention.

Clutch lever 6 is moved to engage main clutch 2 for additive or subtractive registration upon depression of a plus bar 11 or a minus bar 12 respectively (Figs. 1 and 11). Alternatively, plus and minus bars 11, 12, are depressed upon depression of a right shift key 13 and a left shift key 14 respectively; and concurrently the depressed shift key causes the disengagement of registration clutch 3 and the attendant engagement of shift clutch 4 thereby connecting the carriage shifting mechanism to engaged main clutch 2.

The stems of right and left shift keys 13, 14 (Fig. 11) are provided with shoulders which overlie pins in the stems of plus and minus bars 11, 12 respectively. Therefore, depression of a shift key concurrently will depress the related plus or minus bar 11, 12. The plus bar 11 and minus bar 12 are connected by links 15 with an arm 16 which is fixed on a rock shaft 17. Shaft 17 extends across the machine and fixed thereon inwardly of the left side frame is an arm 18 (Fig. 14) having coupling connection 19 with a setting plate 20. Setting plate 20 has opposed lugs 21 positioned at opposite sides of a tooth 22 of clutch lever 6. Upon depression of plus bar 11 or minus bar 12, shaft 17 and plate 20 will be rocked in one or the reverse direction thereby engaging one or the other of lugs 21 with tooth 22 and rocking clutch lever 6 to either its additive or subtractive position. Setting plate 20, when released, is normally spring located in a central position and when in this position, lugs 21 are so spaced from tooth 22 that clutch lever 6 may be moved independently of plate 20, and without interference therefrom, to either of its active positions. Coupling 19 permits plate 20 to be uncoupled from shaft 17 so that clutch lever 6 may be moved to its neutral position while a plus or minus bar is held depressed.

The driving members of registration clutch 3 and shift clutch 4 (Figs. 6 and 8) are connected by a sleeve 23 and are thereby longitudinally movable to compress the friction disks of the normally engaged clutch 3 or alternatively the friction disks (not shown) of the normally disengaged clutch 4. Power is transmitted from main clutch 2 for the registering and carriage shifting operations to the driving members of clutches 3 and 4 by a gear 24 fixed on the driving member of clutch 4 and engaged by the output gear 5 of main clutch 2. The driven element of shift clutch 4 is fast with a gear 25 having intermediate gear connection with a gear 26 fast upon a shaft 27 which carries shift worm 28. A spring urged plunger 29 is mounted on the rear of carriage 30 and engages shift worm 28. Therefore, upon disengagement of registration clutch 3 and the engagement of shift clutch 4, main clutch 2, upon engagement, will drive worm 28 to shift carriage 30 one denominational order for each revolution of the worm.

Figure 8:
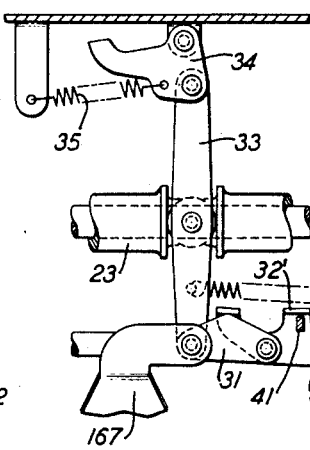
Fig. 8 is a detailed plan view of a portion of the carriage shifting control means.

Registration clutch 3 is held normally in engagement by a toggle comprising links 31—32 (Figs. 6 and 8). Toggle link 32 has fixed pivotal mounting at its right end and link 31 is pivotally connected at its left end to one end of a lever 33. The other end of lever 33 is connected to the machine frame by a link 34 and antifriction rollers mounted intermediate the ends of lever 33 engage a pair of flanges on sleeve 23 which connects the driving members of clutches 3, 4. A spring 35 attached to link 34 biases sleeve 23 toward the left, thereby holding clutch 3 engaged under spring tension. Upon breaking of toggle 31—32, a spring 36 attached to lever 33 will shift sleeve 23 toward the right, thereby disengaging clutch 3 and engaging shift clutch 4. Toggle 31—32 is broken upon depression of a shift key 13 or 14 as follows:

An intermediately pivoted lever 37 (Figs. 11, 12, and 13) is engaged at its forward end by the stems of shift keys 13, 14; and at its rear end lever 37 is pivotally connected with the lower end of an arm 38 which is guided at its upper end by slot engagement with a shaft 39. A shoulder 38' of arm 38 underlies a laterally bent lug of a lever 40 which is fast on shaft 39. A finger 41 (Figs. 6, 8, and 14) also fast on shaft 39 engages a lug 32' of toggle link 32 adjacent its connection with the other link 31 of the toggle. Upon depression of one or the other of the shift keys, lever 37 will be rocked, thereby raising arm 38 and causing shoulder 38' to rock lever 40, shaft 39, and finger 41 to break toggle 31—32. Accordingly, registration clutch 3 will be disengaged and shift clutch 4 engaged as main clutch 2 is selectively engaged to determine the direction of carriage shift.

Certain other controls are necessary in effecting the shifting operation, since the carriage shifting worm 28 (Fig. 6) must be released from a normal location means when the operation is initiated. Also, at the end of the shifting operation, main clutch 2 must be disengaged and toggle 31—32 must be reset to disengage shift clutch 4 and reengage registration clutch 3.

Figure 7:
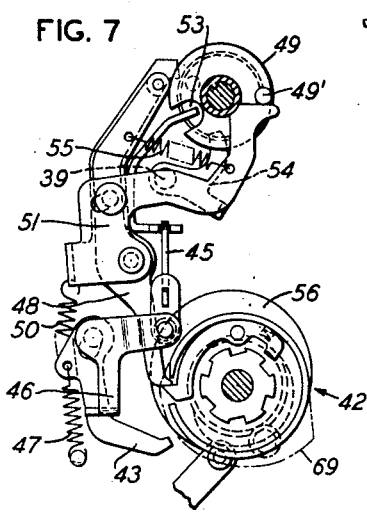
Fig. 7 is a detailed right side view of parts of the carriage shifting control mechanism.

These operations are effected by a two phase shift control clutch 42 (Figs. 2 and 7) which is engaged for a partial cycle of operation when toggle 31—32 is broken and again engaged upon termination of the shift to complete its cycle of operation. The driving element of the clutch has direct gearing connection with the motor 1, and a spring biased clutch pawl mounted upon the driven element of the clutch is normally held out of engagement with the driving element against the tension of its spring by a detent 43 engaging the pawl through a cut-away portion of the clutch housing.

Figure 2:
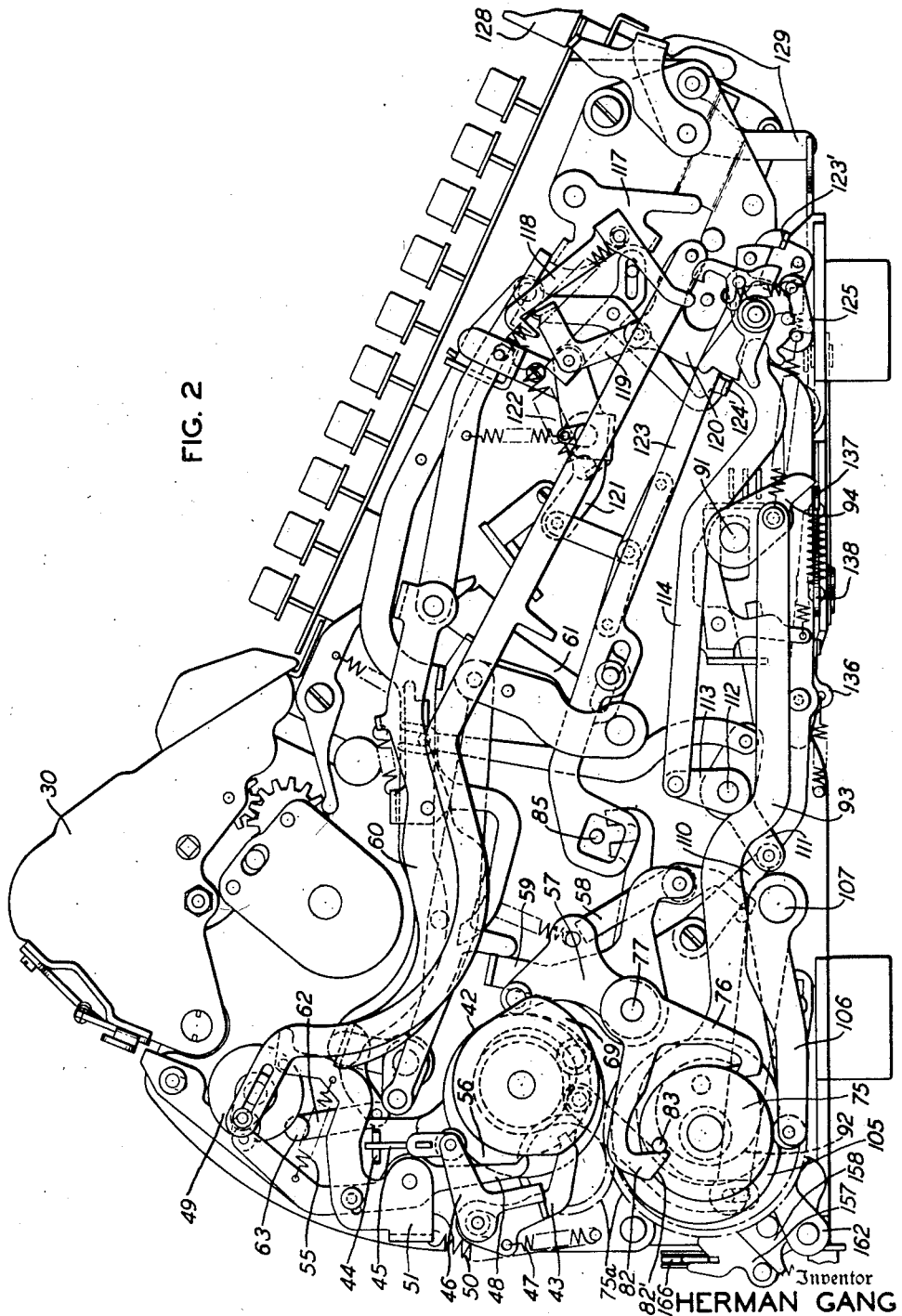
Fig. 2 is a left side view of the machine showing the means for engaging the main clutch, the auxiliary clutch and devices of the invention associated therewith, in normal position.

When toggle 31—32 is broken to initiate a shift, a link 44 (Figs. 6 and 8) connected to a crank extension of toggle link 32 will be moved to the right, thereby rocking a pair of bell cranks 45, 46. Bell crank 46 (Figs. 2 and 7) engages detent 43 and its rocking movement will move the detent against the tension of a spring 47 from engagement with the pawl of clutch 42, thereby permitting the pawl to engage the clutch. The lower active end of an intermediately pivoted detent 48 normally engages the housing of clutch 42, and a roller at the upper end of the detent normally engages a notch in a disk 49, as shown in Fig. 2. Disk 49 is splined on worm shaft 27 (Fig. 6) and the engagement of the roller of detent 48 in the notch of the disk will prevent rotation of shift worm 28 and consequently hold carriage 30 in its shifted position. Upon partial rotation of clutch 42, detent 48 will be urged through the aperture of the clutch housing by a spring 50 attached to a tripping arm 51 which has pin and slot connection with the detent. This movement of detent 48 will engage its lower end with the pawl of clutch 42, thereby disengaging the clutch, and will remove the roller at its upper end from the notch of disk 49, thereby freeing worm 28 for the shifting operation.

The carriage 30 will be continuously shifted until the depressed shift key 13 or 14 is released or until the carriage has been shifted into one or the other of its extreme positions.

Upon release of the shift key, spring 52 (Fig. 11) will restore shaft 39 to provide for reengagement of shift control clutch 42 as follows: Disk 49 is connected by a sleeve with a second disk 53 (Fig. 6) which is normally held toward the left against the bias of a spring 53' by an arm 44' of link 44. Upon breaking of toggle 31—32, arm 44' will be moved to the right with link 44. However, disk 53, and with it disk 49, will now be held in leftward position by a stop arm 54 (Fig. 7), which is fixed on shaft 39 and is moved into engagement with disk 53 when said shaft is rocked to break toggle 31—32. When shaft 39 is restored upon release of the depressed shift key, a stop arm 54 will be moved from engagement with disk 53 and spring 53' (Fig. 6) will then be effective to move disks 53, 49 toward the right. Upon movement of disk 49 to the right, a pin 49' (Fig. 7) on the disk will be brought into the plane of a cam extension of tripping arm 51. As the current shift cycle nears completion, pin 49' will engage the cam extension of the tripping arm 51, thereby putting detent 48 under tension of a spring 55 which connects the detent and the tripping arm. Therefore, as the parts arrive at full cycle position the roller of detent 48 will be moved into the notch of disk 49 thus locating the carriage in its new position and rocking said detent from engagement with the pawl of clutch 42 thereby permitting reengagement of the clutch.

The final phase of operation of shift control clutch 42 effects the disengagement of main clutch 2 and resets toggle 31—32, thereby reengaging registration clutch 3 and disengaging shift clutch 4. For the purpose of disengaging main clutch 2, a cam 56 fast with the driven element of clutch 42 engages a roller mounted on a follower 57 (Fig. 2). Follower 57 has latch connection 58 with a lever 59 which engages a shoulder of a link 60. Link 60 is pivotally attached at its forward end to the upper end of a stop arm 61 which is pivotally mounted at its lower end to the machine frame, and at its rear end link 60 is attached to a crank 62 fixed on a rock shaft 63 which extends across the machine. Stop arm 61 (Fig. 5) is spring biased in normal counterclockwise position against a fixed stop and in the final operation of clutch 42, stop arm 61 will be rocked in clockwise direction by cam 56 through the connecting linkage and returned to normal by its spring. In the reciprocatory movement of stop arm 61, a cam slot 64 at the rear of an extension 65 of the arm will engage a pin 66 of clutch lever 6 thereby moving said lever to neutral position. Furthermore, upon reciprocation of arm 61, shaft 63 will be rocked counterclockwise (Fig. 2) and return by link 60. Shaft 63 has link connection 67 (as shown in dotted lines) (Fig. 11) with an arm 68 which is pivotally mounted on the right side frame. When shaft 63 is rocked, arm 68 will be rocked to effect operations to be described in connection with the devices of the invention.

Toggle 31—32 will be reset during the final operation of clutch 42 by means of a cam 69 (Figs. 2 and 7) fast on the driven element of the clutch and engaging a roller on bell crank 46. Thus, bell crank 46 and connected bell crank 45 will be restored, thereby moving link 44 to the left (Figs. 6 and 8) and resetting toggle 31—32 which will reengage registration clutch 3 and disengage shift clutch 4. Also, restored bell crank 46 will release detent 43 which will engage the pawl of clutch 42 and disengage said clutch.

Should the right shift key 13 or left shift key 14 (Fig. 11) be held depressed until the carriage is shifted into either of its extreme positions, shift initiating shaft 39 will be restored to normal and the drive terminated in substantially the same manner as described when shaft 39 is restored upon release of a shift key. For this purpose, two lugs 70 (one of which is shown in Fig. 11) are located on the rear of carriage 30 and so spaced that the nose of a plunger 71 mounted on arm 38 is positioned just below one or the other of said lugs when the carriage is in either of its extreme end positions. Should the carriage be in the extreme right hand position, for example, and the left shift key 14 depressed, the plunger 71 which is spring urged to a normal extended position will be depressed by contact with the leftmost lug 70 when arm 38 is raised and the shift initiated. When the carriage is shifted from the extreme right hand position, the lug 70 will be removed from contact with plunger 71 and said plunger will be spring urged to its extended position. As the carriage is shifted into the extreme left hand position, the side of the nose of the plunger 71 will be engaged by the rightmost lug 70, thereby moving the plunger and arm 38 toward the rear of the machine against the tension of a spring 72. This movement of arm 38 will remove the shoulder 38' thereof from restraining engagement with the lug of lever 40 allowing said lever and shaft 39 to be spring restored to normal and thus terminate the shift. Upon movement of stop arm 61 (Fig. 5) to disengage main clutch 2, a pin 61' of the stop arm will engage and disconnect coupling 19 so that setting plate 20 may be spring restored to normal and thus permit clutch lever 6 to be moved to neutral position. When the shift key and the related plus or minus bar 11 or 12 is finally released, coupling 19 will be restored by shaft 17 to reengage setting plate 20. Also, upon release of the shift key, plunger 71 will drop below lug 70 and arm 38 will be urged forward by its spring, thus locating the shoulder 38' thereof in normal engagement with lever 40.

*Tabulating mechanism*

Carriage tabulating means is constructed and operates substantially in accordance with the disclosure of applicant's copending application Serial No. 8,544, now Patent 2,531,204, to which reference is made for the constructional and operational details.

The tabulating mechanism comprises a series of settable keys 73 (Figs. 1 and 11) representing the intermediate denominational positions to which carriage 30 is shiftable. The tabulating keys are so constructed that the depression of any key will release any other set keys. Upon depression of a tabulating key 73, a lug 74 at the end of the key stem will be lowered into the plane of the fixed lugs 70 which terminate the carriage shift in the extreme end positions. Lugs 74 operate in conjunction with plunger 71 in substantially the manner described in connection with the fixed lugs 70. However, lugs 74 are of such configuration that they are effective to terminate the carriage shift in the indicated position upon movement of the carriage therein from either direction.

Should the carriage be in a position corresponding to a depressed tabulator key 73, the carriage shift mechanism will operate to shift the carriage from that position to one or the other end positions or to the position corresponding to another depressed tabulator key. This operation is permitted by plunger 71 which will be depressed by engagement with lug 74 of the depressed tabular key upon initiation of a carriage shift operation.

*Auxiliary clutch operation*

The auxiliary clutch 75 (Fig. 2) is driven by a gear train 75a from the electric motor 1 and is of well known construction in which a spring urged pawl mounted on the driven member of the clutch is held out of engagement with the driving member by a detent 76, thereby disengaging the clutch. Detent 76 is fixed on a shaft 77 which is journalled in the machine framing and is normally held in clockwise clutch disengaging position by a latch 78 (Fig. 9) engaging a shoulder 79' of a slide 79. Slide 79 is held toward the rear of the machine against the tension of a spring 80 by latch 78 and has pivotal connection at its rear to the depending arm of a bell crank 81 (Fig. 3) which is fixed on shaft 77. Upon clockwise movement of latch 78, slide 79 will be released and moved toward the front of the machine by spring 80, thereby rocking shaft 77 and detent 76 in counterclockwise direction, thus releasing the pawl of clutch 75 to engage the drive to the motor.

As clutch 75 approaches full cycle position, detent 76 will be restored to clutch disengaging position by a member driven by the clutch, thereby limiting the operation to a single cycle. To this end, a horizontally disposed arm 82 (Fig. 2) integrally connected with detent 76 is provided at its free end with a cam face 82'. When detent 76 is moved counterclockwise to engage clutch 75, the free end of arm 82 will be moved downwardly, thus moving the cam face 82' into position to be engaged by a pin 83 mounted on the driven member of the clutch. As clutch 75 approaches full cycle position, pin 83 will engage cam face 82' and raise arm 82, thereby rocking detent 76 clockwise into position to engage the pawl of the clutch and disconnect the drive when the clutch reaches full cycle position. Upon movement of detent 76 to clutch disengaging position, shaft 77 and bell crank 81 (Fig. 3) will be rocked clockwise, thereby moving slide 79 to the rear. As clutch 75 moves into full cycle position, pin 83 will pass a slight distance beyond cam face 82' and the movement afforded slide 79 will bring shoulder 79' a slight distance to the rear of latch 78 (Fig. 9) which will be spring urged into latching position. Slide 79 will then be spring urged into engagement with latch 78 and arm 82 and detent 76 will be rocked counterclockwise a slight distance to the position shown in Fig. 2. Should latch 78 be held in slide releasing position until clutch 75 completes its cycle of operation, an auxiliary latch 84 will operate to engage shoulder 79' of side 79, thus holding detent 76 in clutch disengaging position. Auxiliary latch 84 has spring connection and common pivotal mounting with latch 78. When latch 78 is moved clockwise to release slide 79, auxiliary latch 84 will be spring urged clockwise and thus will be moved into the path of shoulder 79' when slide 79 is restored to the rear. When latch 78 is finally released, it will be spring urged counterclockwise into engagement with auxiliary latch 84, thus moving said latch from engagement with shoulder 79' while at the same time itself moving into latching position to restrain slide 79. During operation of auxiliary clutch 75, an interlock operates to prevent movement of clutch lever 6 and to engage main clutch 2. The interlock comprises the forked free end of the horizontally disposed arm 81' (Fig. 3) of bell crank 81. When detent 76 is moved to engage clutch 75, the forked end of arm 81' will engage a pin 85 on clutch lever 6, thereby positively holding said lever in neutral position until detent 76 is restored to disengage auxiliary clutch 75.

*Register clearing operation of the auxiliary clutch*

Auxiliary clutch 75 may be operated selectively to clear the multiplier-quotient register 86 (Fig. 1), the product dividend register 87, or the keyboard 88. As fully disclosed in applicant's copending application, Serial No. 8,547, now Patent 2,531,206, three clear keys are provided, each of which upon depression operates to engage clutch 75 and to select the clearing operation to be performed. Each of the clear keys is related to a slide respectively and upon depression of any one of the keys the related slide is moved to release latch 78 (Fig. 9) thus engaging clutch 75 and also connecting said clutch with one of a series of drive trains to select the clearing operation. The slides, however, may be moved independently of the clear keys and the devices of the invention as hereinafter disclosed are adapted to move slide 89 toward the left (Fig. 9) to engage clutch 75 and connect said clutch with a drive train to clear multiplier-quotient register 86. Therefore, the operation of clutch 75 will be described only in connection with slide 89.

Slide 89 (Fig. 9) is pivotally supported at its rightmost end to one arm of a bell crank 90 and the leftmost end of the slide abuts an upstanding ear 78' of latch 78. Therefore, upon movement of slide 89 to the left, latch 78 will be moved to release slide 79, thereby engaging clutch 75 as heretofore described. Upon forward movement of released slide 79, the forward end of said slide will engage a recess adjacent the left end of slide 89 and hold said slide in adjusted position.

Clutch 75 during its cycle of operation will rock a shaft 91 (Figs. 2, 9, and 14) extending across the machine and which upon adjustment of slide 89 is connected with a drive train to clear register 86. To this end, the driven member of clutch 75 is provided with an eccentric 92 (shown in dotted lines Fig. 2). Eccentric 92 is adapted to impart a reciprocatory movement to a link 93 which is attached at its forward end to a crank 94 fixed on shaft 91 exteriorly of the left side frame. Thus, when clutch 75 is operated, shaft 91 will be rocked clockwise (Fig. 2) during the first half of the cycle and back to normal during the second half.

Figure 14:
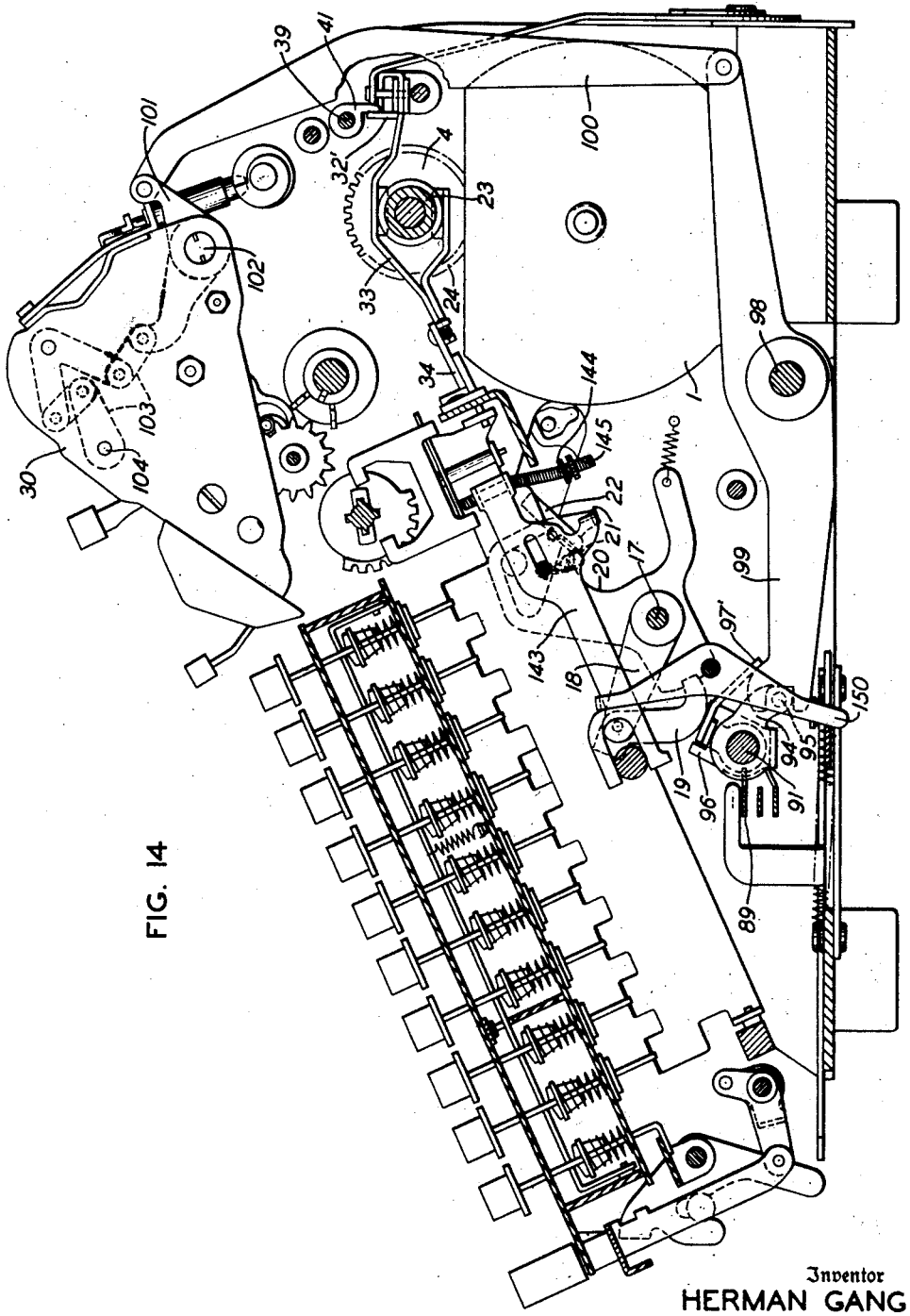
Fig. 14 is a sectional view taken through the keyboard of the machine and showing certain parts that are mounted on the inner face of the right side frame.

Slidably mounted on shaft 91 inwardly of the right side frame is a rearwardly extending arm 94 (Figs. 9 and 14) having a pin 95 extending to the left thereof. Integral with arm 94 and positioned to the left thereto is a member 96 provided with an upstanding portion having an open end slot. Further to the left and fixed on shaft 91 is a collar 97 having an arm extending to the right thereof and engaging the open end slot of member 96. Pivotally mounted on a shaft 98 (Fig. 14) is a lever 99 having at its forward end an open end slot, the bottom of which is defined by an ear 99' which is offset to the right (Fig. 9). Normally, the forward end of lever 99 is held downwardly by a finger 97' (Fig. 14) extending rearwardly from the rightwardly extending arm of collar 97, thus locating offset ear 99' a slight distance below pin 95. At its rearward edge slide 89 has slot connection with the rim of member 96. Therefore, when slide 89 is moved to the left, member 96 and connected arm 94 will be moved accordingly, thereby entering pin 95 within the slot at the forward end of lever 99. Thus, when shaft 91 is rocked, pin 95 will be rocked accordingly through the connected parts and raise the forward end of lever 99, thereby rocking said lever clockwise (Fig. 14).

The rearward end of lever 99 is pivotally connected to the lower end of a link 100 which is pivotally attached at its upper end to an arm 101 having bearing in the right side frame and splined on rockable carriage shaft 102. Therefore, when lever 99 is rocked, link 100 will be moved downwardly and rock shaft 102 which through linkage 103 will likewise rock a shaft 104 extending across carriage 30. Shaft 104, when rocked operates clearout means to return the wheels of register 86 to zero, as, for example, in the manner disclosed in Patent 1,781,320 to L. P. Crosman. As shaft 91 is rocked back to normal, the connected drive train also will be restored and upon movement of latch 78 to engage slide 79, ear 78' of said latch will move slide 89 toward the right to normal position, thereby removing pin 95 from driving engagement with lever 99.

Upon each operation of auxiliary clutch 75, the front of carriage 30 is lifted. This operation is necessary to unmesh the intermediate gears in the carriage from the intermediate gears in the machine body during a clearout operation for the dividend-product register 87. This operation is unnecessary in the above-described clearance of multiplier-quotient register 86 or to clear keyboard 88 and is therefore incidental to these operations. However, the carriage lifting operation is utilized in the operation of the devices of the invention to be described. A cam 105 (Fig. 2) rotated with the driven member of clutch 75 serves to depress an arm 106 at the beginning of the cycle, thereby rocking a shaft 107 on which said arm is fixed. A pair of arms 108 (Figs. 10, 11, and 15) adjacent the inner faces of the side frames respectively are also fixed on shaft 107 and through means not concerning the invention operate to raise the carriage. As clutch 75 moves into full cycle position, cam 105 will permit a spring 109 (Fig. 11) to restore shaft 107, thereby lowering the carriage and moving the lifting connections to normal position.

*Main clutch engagement to initiate a division operation*

As fully disclosed in the aforenoted copending application, Serial No. 8,548, now Patent 2,531,207, a program of division is initiated upon release of spring impelled mechanism to effect various essential machine adjustments and to engage main clutch 2 for negative operation. The spring impelled mechanism is normally restrained by a latch 110 (Fig. 2) corresponding to part 725 in the copending application and which, according to said copending application, is directly released upon depression of a divide key. Latch 110 is released upon counterclockwise movement and the devices of the present invention thereinafter described utilize power from auxiliary clutch 75 to release said latch in lieu of direct release by the divide key.

Latch 110 (Figs. 2, 3, and 5) normally engages a roller at the end of one arm of a crank 111 which is fixed on a shaft 112 journalled in the machine side frames extending across the machine. Another crank 113 also is fixed on shaft 112 and has pivotal attachment to the rear end of a forwardly extending setting arm 114. A spring 115 (Fig. 3) attached to a third crank 116 on shaft 112 biases said shaft and the parts fixed thereon in clockwise direction. Normally, the parts are held in the counterclockwise position shown in Figs. 2 and 5 by the end of latch member 110 engaging the roller of crank 111. Upon counterclockwise movement of latch 110, its holding end will be removed from the roller of crank 111 and the parts mounted on shaft 112 will be impelled by spring 115 to the clockwise position shown in Fig. 3.

Upon clockwise movement of crank 113, setting arm 114 will be moved toward the front of the machine. Upon forward movement of arm 114, an upstanding finger 114' at the forward end of said arm will rock a pivotally mounted plate 117 counterclockwise against the tension of a spring 117' from the position shown in Figs. 2 and 5 to that shown in Fig. 3. A hook 118 pivoted on plate 117 normally overlies an arm of one link of a toggle 119—120. Toggle 119—120 normally holds a lever 121 in counterclockwise position (Figs. 2 and 5) against the tension of a spring 122. Upon counterclockwise movement of plate 117, hook 118 will be moved downwardly, thus engaging the arm of toggle link 119, thereby breaking toggle 119—120 and releasing lever 121 which will be rocked by spring 122 to the clockwise position shown in Fig. 3. The clockwise movement of lever 121 will operate through one of a pair of setting slides 123—124 (more clearly shown in Fig. 4) in conjunction with a direction control plate 125 to move clutch lever 6 counterclockwise, thereby engaging main clutch 2 for negative operation in the following manner:

Direction control plate 125 is pivotally mounted on a stud in the left side frame near the front of the machine and is adjustable to positive or alternatively negative controlling positions. Normally, plate 125 is spring held in counterclockwise positive controlling position (Fig. 2). However, upon forward movement of setting arm 114, plate 125 will be adjusted clockwise to negative controlling position (Fig. 3) as fully disclosed in the aforenoted copending application, Serial No. 8,548. The setting slides are positioned adjacently, one behind the other, and have square openings of like size normally aligned at their rear ends with pin 85 of clutch lever 6 extending outwardly therethrough. It will be noted that when the parts are in their normal positions (Fig. 2) pin 85 is centrally located between the front and rear edges which define the openings of slides 123—124 and that the distance is sufficient to allow adjustment of clutch lever 6 without interference from the slides.

Control plate 125 comprises a right wing 125a and a left wing 125b. A forwardly extending lug 123' of slide 123 normally is located a slight distance to the right of plate 125 and a lug 124' of slide 124 a slight distance to the left. Lug 123' is adapted for engagement with wing 125a and alternatively lug 124' is adapted for engagement with wing 125b. Lever 121 is connected at its rear end by a pair of diverging links 126—127 to slides 123—124 respectively. When lever 121 is rocked clockwise upon breaking of toggle 119—120, link 126 will tend to move link 123 toward the rear of the machine and link 127 will tend to move link 124 toward the front of the machine. However, the right wing 125a will be adjusted into the path of movement of lug 123' and left wing 125b raised above and out of the path of movement of lug 124' upon clockwise adjustment of control plate 125. Therefore, lug 123' will engage right wing 125a (Fig. 3) and rearward movement of slide 123 will be prevented. Lug 124', however, will be permitted movement below left wing 125b and therefore slide 124 will be moved toward the front of the machine. Upon forward movement of slide 124, the rear edge of the opening at the rear of said slide will engage pin 85 thereby moving clutch lever 6 in counterclockwise position to engage main clutch 2 for negative operation as shown in Fig. 3. The devices of the invention, to be described, concern only the control of the engagement of main clutch 2 and reference is made to applicant's aforenoted copending application 8,548 for a complete disclosure of the division program initiated upon engagement of clutch 2.

*Initiation of division with preliminary register clearing and carriage position control*

The devices of the invention in the disclosed embodiment operate in conjunction with a single cycle of auxiliary clutch 75 to institute a program of division. The devices are adjusted to active position upon depression of an operating member comprising a settable divide key 128 (Figs. 1, 2, 3, and 5) and operate to engage clutch 75 and to engage operating connections for clearing the multiplier-quotient register 86 by the clutch. If the register carriage is displaced from its rightmost position, the operation of clutch 75, subsequent to its clearing operation, will institute a rightward carriage shift which will be terminated with the carriage in its rightmost position or in a position indicated by a set tabulating key 73. Upon termination of the carriage shift, mechanism which is spring charged by clutch 75 but restrained from operation, will be released and operate to release latch 110 to initiate the division program as previously described. If, however, the carriage is in its rightmost position, clutch 75, subsequent to its clearing operation, will directly release latch 110 to initiate the division operation.

Figure 15:
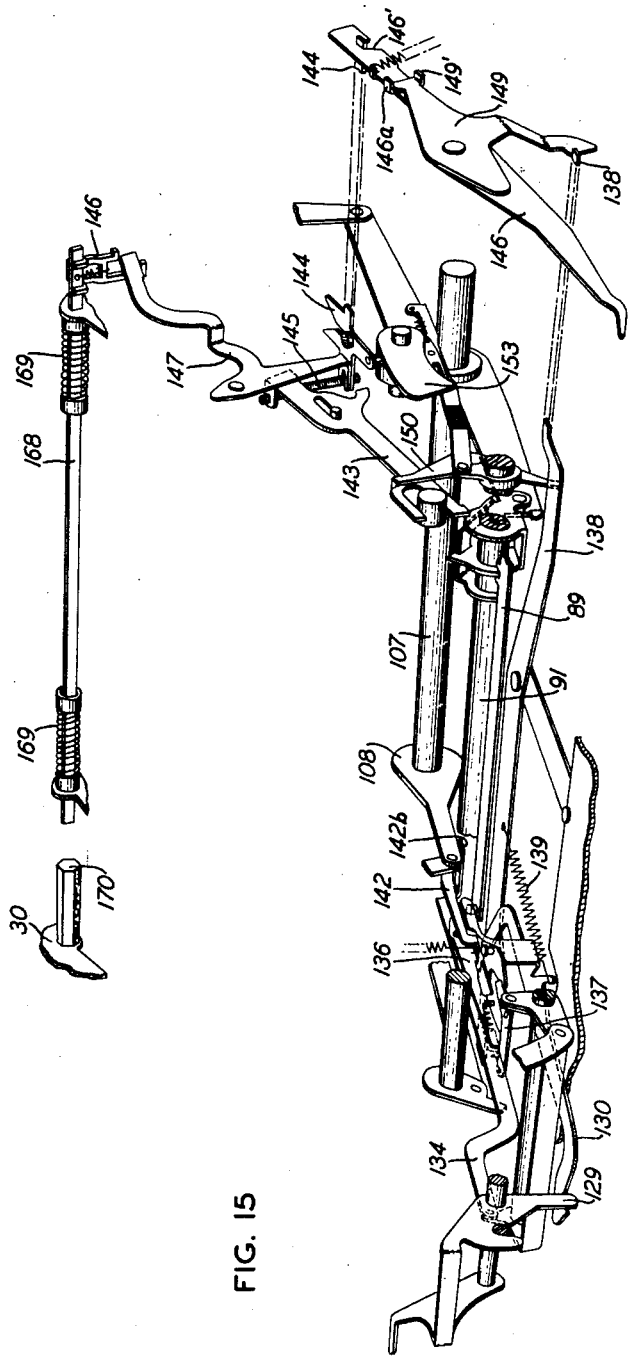
Fig. 15 is an exploded fragmentary perspective showing devices of the invention related to the carriage shift and carriage position control means.

In certain instances it may be desirable to institute the division operation without operation of the preclearing and carriage position control means. Therefore, disabling means comprising a latch 129 is manually settable to prevent counterclockwise movement of a lever 130 (Fig. 10) which, when restrained from such movement, provides for the operation of clutch 75 for the single purpose of initiating the division program. Lever 130 will be enabled by counterclockwise setting of latch 129 from the position shown in Fig. 2 to the position shown in Fig. 3. With lever 130 enabled and the carriage displaced from its rightmost position, the operation of the devices of the invention are as follows:

The lower end of the stem of divide key 128 is pivotally attached to an arm 131 fixed to a bail 132 which is pivotally mounted on a shaft 133. A link 134 is pivotally attached at its forward end to an upstanding arm at the left end of bail 132 (Fig. 5) and extends to the rear of the machine where it is pivotally mounted on one arm of a bell crank 135. Upon depression of divide key 128, arm 131 and bail 132 will be rocked clockwise from the position shown in Fig. 5 to that shown in Fig. 3, thereby moving link 134 toward the front of the machine. A trip arm 136 is pivotally mounted on link 134 and is spring urged clockwise (Fig. 5), counterclockwise (Fig. 15), to lower its forward free end into the plane of an arm of a spring set latch 137 (Figs. 10 and 15). Upon forward movement of link 134, the forward end of arm 136 will move latch 137 counterclockwise, thereby releasing a lever 138.

As best seen in Fig. 10, lever 130, latch 137 and lever 130 are mounted on suitable supporting and guide plates at the under side of the machine. Levers 130, 138 are connected by a spring 139 which urges each of said levers in counterclockwise direction. Normally, lever 138 is restrained by latch 137 and lever 130 by engagement with a stud 140 on restrained lever 138. Upon release of latch 137, lever 138 and simultaneously lever 130 will be permitted counterclockwise movement by spring 139.

A cam plate 138' is mounted on lever 138 inwardly of the end of its left arm. Upon counterclockwise movement of lever 138, cam plate 138' will engage a depending pin 78a on latch 78, thereby moving said latch to release slide 79. As previously described, released slide 79 will be spring moved toward the front of the machine to engage auxiliary clutch 75 for a single cycle of operation. Simultaneously with the operation of lever 138, a finger 141 (Figs. 9 and 10) on lever 130 by engagement with a pin 89' of setting slide 89 will move said slide to the left, thereby engaging the clearing connections for multiplier-quotient register 86, also as previously described. It will be noted that slide 89, by engagement with ear 78', would be effective to release latch 78 without the operation of cam plate 138'. However, as hereinafter described, when lever 130 is disabled by latch 129, cam plate 138' must operate to engage clutch 75 without movement of the setting slide, thereby providing for operation of the clutch with the clearing drive disconnected.

The first half cycle of clutch 75 will rock crank 94 and shaft 91 clockwise (Fig. 2) to effect the register clearing operation as previously described. This movement of crank 94 is utilized to restore levers 138 and 130 to normal latched position. At this time, the forward end of trip arm 136 must be raised from engagement with latch 137 to permit the latch to be spring moved into latching position. For this purpose, an arm 142 (Figs. 3, 5, 10, and 15) pivoted on the right side frame and spring urged in upward direction, is provided with a pair of lugs 142a, 142b, underlying trip arm 136 and carriage lifter arm 108 respectively. Arm 142 is normally held in lowered position by the engagement of its lug 142b with lifter arm 108 and trip arm 136 is located downwardly in the plane of latch 137 by lug 142a. The spring which biases arm 142 upwardly is considerably stronger than the spring which holds trip arm 136 in lowered position. Therefore, when carriage lifter arm 108 is raised upon movement of clutch 75 from full cycle position, arm 142 will follow, thereby raising the forward end of trip arm 136 to release latch 137. Crank 94 has a depending finger extending into the plane of the left end of lever 138 (Figs. 2 and 3). When lever 138 is released from latch 137 and moved clockwise, its left end will move forwardly to a position adjacent the finger of crank 94. Thus, when crank 94 is rocked clockwise, its finger will engage and rock lever 138 to normal latched position and also lever 130 will be moved to normal by the stud 140 on lever 138. When carriage lifter arm 108 is lowered as clutch 75 completes its cycle, arm 142 will be moved downwardly therewith, thus permitting trip arm 136 to be lowered and rest upon latch 137. When link 134 is moved to the rear at the conclusion of the division program, trip arm 136 will be spring moved to tripping position at the rear of latch 137.

Clutch 75 in its clearout cycle of operation is, upon adjustment of certain mechanisms, adapted to initiate a rightward carriage shift by depression of right shift key 13. This operation and also the operation of clutch 75 to initiate a leftward carriage shift is fully disclosed in applicant's copending application Ser. No. 8,547, now Patent 2,531,206. The adjustments necessary for the right shift initiating operation include the forward setting of a shift direction determining slide 143 and the release of a spring urged rocker 144 (Figs. 14 and 15).

Slide 143 is mounted on suitable studs on the inner face of the right side frame and is adapted for rearward or left shift setting, as shown in Figs. 14 and 15; and for forward or right shift setting. The slide is retained in either of its adjusted positions by a toggle spring and may be in either its forward or rearward position as a result of a setting in connection with a previous operation. A vertically positioned lever 150 is mounted on the inner face of the right side frame and has at the end of its upper arm a lug engaging slide 143. The lower arm of lever 150 extends downwardly into the path of movement of lever 138 adjacent its right free end. Therefore, when lever 138 is released upon depression of divide key 128 and is moved counterclockwise (Fig. 15), it will engage and move lever 150 counterclockwise. Thus, if slide 143 is positioned to the rear, it will be moved by lever 150 to its forward or right shift setting.

Mounted at the rear and extending downwardly from slide 143 is a tightly wound spring 145 (Figs. 14 and 15) having its lower end extending through a hole located at the end of an inwardly extending arm of rocker 144. Rocker 144 is pivotally mounted on a bracket on the outer face of the right side frame, and its inwardly extending arm which has connection with spring 145 passes through an opening in the frame. Rocker 144 is adapted to be rocked in a plane substantially parallel to that of the keyboard and is biased in one or the reverse direction by spring 145. The spring tends to assume a straightened position and the bias is effected upon setting of slide 143 to displace the top of spring to the front or to the rear. Thus, upon forward setting of slide 143, spring 145 will bias rocker 144 in counterclockwise direction.

A lever 147 (Figs. 13 and 15) pivotally mounted on the outer face of the right side frame has a downwardly extending arm which terminates in an inwardly bent portion having slot connection with spring 145 adjacent the inwardly extending arm of rocker 144. Thus, lever 147 is biased in clockwise direction by spring 145 as rocker 144 is biased in counterclockwise direction. A rearwardly extending arm of lever 147 cooperates with a stop 146 when the carriage is in its rightmost position to prevent movement of rocker 144.

Normally, rocker 144 is held in a central position against the bias of spring 145 by a lever 146 (Figs. 11 and 15) mounted outwardly from the right side frame and spring urged in clockwise direction. Lever 146 is provided, at its lower edge adjacent its right free end with a recess 146' which normally engages an outwardly extending arm of rocker 144 thereby holding the rocker in central position.

A crank plate 149 has common pivotal mounting with lever 146. One arm of crank 149 extends rearwardly with its end underlying a lug 146a on lever 146. A second arm of the crank extends downwardly and into the path of movement of the right free end of lever 138. Therefore, upon counterclockwise movement (Fig. 10) of lever 138, its free end will rock crank 149 and lever 146 counterclockwise (Figs. 11 and 15) thereby releasing rocker 144 from recess 146' concurrently with the forward setting of slide 143.

As will be later described, the operation of clutch 75 will, with rocker 144 released, be effective to depress right shift key 13. This operation, however, will be effected during the last half cycle of clutch 75. It will be recalled that lever 138 is reset during the first half cycle of clutch 75 and this action would permit reengagement of rocker 144 by recess 146'. Therefore, latching means is provided to hold lever 146 in counterclockwise rocked position. The latching means comprises a pivotally mounted arm 151 (Fig. 11) having an upstanding finger with its end normally positioned at the left side of lug 146a of lever 146. Arm 151 is biased clockwise by spring connection with the right arm of a lever 152 but, however, is restrained by engagement with a lug at the end of the arm. Lever 152 is spring biased in clockwise direction to engage a depending finger 152' thereof with the free arm of bell crank 98 (Fig. 9), the other arm of which is connected to the clearout setting slide 89. When slide 89 is moved to the left to engage the clear out connections as heretofore described, bell crank 98 will be moved counterclockwise thereby moving lever 152 counterclockwise to release latch arm 151. Therefore, when lever 146 is rocked to release rocker 144, the finger of arm 151 will be moved clockwise beneath lug 146a to hold the lever in rocked position. A second latch 152a is operable to hold lever 146 in rocked position in connection with other machine operations not concerning the invention. Therefore, a lug 149' at the end of the right arm of crank 149 is moved into position to block latching movement of latch 152a when the crank and lever 146 are rocked.

The means adjustable by released rocker 144 and thereupon operable by clutch 75 to depress right shift key 13 comprises an arm 153 (Figs. 11, 12, 13, and 15) of a power transmission train. Arm 153 has a circumferentially slotted hub rotatably and laterally movable on a stud shaft extending outwardly from the right side frame. Integral with the hub of arm 153 is a depending crank 154 (Fig. 12) which has yieldable link connection 155 with an upstanding crank 156 fast on the right end of shaft 91 exteriorly of the right side frame. It will be recalled that upon operation of clutch 75 shaft 91 is rocked counterclockwise (Figs. 11 and 12) and return. Therefore, arm 153 will be rocked clockwise and return by shaft 91 through crank 156, link 155, and crank 154, upon each operating cycle of clutch 75.

A pair of pins 13', 14' (Fig. 13) in the stems of right and left shift keys 13 and 14 respectively, extend in aligned and spaced relationship one toward the other. Normally, arm 153 is centrally located between and out of engagement with pins 13'—14' by a pin in a forwardly extending arm of rocker 144 in engagement with the circumferential slot in the hub of said arm 153. Therefore, in the normal operation of clutch 75, arm 153 will be idly raised above and then lowered between pins 13'—14'. However, upon release of rocker 144 by lever 146, the rocker which is spring biased in counterclockwise direction will move arm 153 outwardly on the stub shaft on which it is slidably mounted, thus engaging the outer face of the arm with pin 13' of right shift key 13. As arm 153 is raised, it will escape above pin 13' and be moved further outwardly and thus into engagement with the stem of shift key 13. Therefore, upon the return downward movement of arm 153, its lower edge will engage pin 13', thereby depressing and holding shift key 13 to effect a rightward carriage shift.

As heretofore described, setting slide 89 (Fig. 9) will be restored as clutch 75 completes its cycle, thus releasing latch arm 151 of lever 146 through bell crank 90 and lever 152. However, the outwardly extending arm of rocker 144 in its counterclockwise movement will have been positioned to the right and out of alignment with recess 146' of lever 146. Therefore, released lever 146 will be spring moved a slight distance downwardly to rest upon the outward arm of rocker 144. The carriage shift will be terminated in the rightmost position or in a position indicated by a depressed tabulating key with shift key 13 held depressed and as an incident thereto, arm 68 (Fig. 11) will be rocked counterclockwise and return, as previously described. Upon counterclockwise movement of arm 68, an upstanding finger thereof will engage a cam slot at the rear of rocker 144, thereby moving the rocker and arm 153 to central position, thus releasing shift key 13. Furthermore, upon centralization of rocker 144, its outward arm will be moved to alignment with recess 146' thus permitting clockwise movement of lever 146 and the engagement of recess 146' with said outward arm to hold the rocker and arm 153 in normal centralized position.

Should the divide key 128 be depressed with the carriage in a position corresponding to a depressed tabular key 73, the register clearing operation will initiate a carriage shift which will be terminated in the rightmost position or in a position corresponding to another depressed tabular key. The carriage shift from the position corresponding to the depressed tabular key will be permitted as previously described in connection with the tabulating mechanism.

Upon depression of divided key 128, devices of the invention are adjusted into position to be sprin charged by power from auxiliary clutch 75. Latching means are positioned upon initiation of the right carriage shift operation to hold the operation of the spring charged mechanism in abeyance. Upon termination of the carriage shift, the spring charged mechanism will be released and thereupon operated to release latch 110, thereby initiating the division program as previously described.

The spring operated mechanism comprises a crank plate 157 and a power transmission plate 158 (Figs. 2, 3, 16, 17, and 18) which are included in a second train for transmitting power from clutch 75. Plates 157—158 have common pivotal mounting on a stud 159 on the outer face of the left side frame at the rear of the machine. Plates 157—158 are connected by a strong spring 160 which urges the plates counterclockwise and clockwise respectively; the movement being limited by engagement of a stud 161 on plate 157 with a rearward extension of plate 158. A link 162 is pivoted at its rear on plate 157 below the pivot 159 of the plate and is supported adjacent its forward end by a pin 134' on link 134 extending outwardly through a slot in said link 162. When divide key 128 is retracted and link 134 is in normal rearward position (Fig. 16), pin 134' engaging the rear of the slot in link 162 positions said link toward the rear, thereby locating spring connected plates 157—158 as a unit in clockwise position. A pin 162' at the forward end of link 162 engages latch 110 and, as will be described, moves forwardly with link 162 to release the latch upon operation of the spring charged mechanism.

An arm 163 is pivoted at its rear on transmission plate 158 above stud 159 and extends forwardly with its free end normally below a square stud 81a extending inwardly from the depending arm of bell crank 81. A lever 164 is pivoted on stud 159 to the rear of plate 157 and is urged counterclockwise by a spring 165. Normally, however, lever 164 is held in clockwise position (Fig. 16) by a pin 134a on link 134 engaging the upper edge of the forwardly extending arm of said lever. Lever 164 is provided at the end of its forward arm with an opening 164' comprising a reduced or slotted forward portion and an enlarged downwardly extending rearward portion. A pin 163' on arm 163 normally engages the forward slotted portion of opening 164', thereby locating the free end of said arm in position below stud 81a.

Upon depression of divide key 128 and the attendant forward movement of link 134 (Fig. 17), pin 134a will be moved away from the forward arm of lever 164. Therefore, lever 164 released from the restraint of pin 134a will be moved counterclockwise by spring 165 and by virtue of the slot and pin connection 163'—164', the forward end of arm 163 will be raised into engagement with stud 81a on crank 81. Concurrently with the above movement, detent 76 (Fig. 2) will be moved counterclockwise to engage auxiliary clutch 75 as described. Therefore, shaft 77 on which detent 76 is fixed will be moved counterclockwise and crank 81 fixed thereon also will be moved counterclockwise to the dot-dash position shown in Fig. 16. The counterclockwise movement of crank 81 will position stud 81a thereon a slight distance forwardly of a step 163a on the upper free end of arm 163 with the free end of the arm moved upwardly into engagement with the under side of stud 81a.

It will be recalled that detent 76 and crank 81 are restored clockwise just before the end of the cycle of clutch 75 by engagement of pin 83 on clutch with arm 82 of the detent. However, before this clutch disengaging movement of detent 76, right shift key 13 will have been depressed by the action of clutch 75 and therefore toggle 31—32 will be broken to initiate the right carriage shift. The breaking of toggle 31—32 will operate to position a latch arm 166 (Fig. 6) to hold in abeyance the operation of the main clutch enging mechanism which will be spring charged by the movement of crank 81 clockwise to normal.

Arm 166 has common pivotal mounting with a bell crank 167 at the lower rear of the machine. One arm of crank 167 extends upwardly and has pivotal connection at its end with toggle link 31 (Fig. 8) at its point of connection with lever 33. Arm 166 extends to the right (Fig. 6) and is spring urged downwardly with an offset lug thereof engaging the right arm of crank 167, thereby locating the free end of said arm 166 just above a slot 157' in crank plate 157 (Fig. 16). When toggle 31—32 is broken, bell crank 167 will be moved clockwise, thereby permitting arm 166 to be spring moved clockwise to engage its free end with slot 157' of plate 157. (Fig. 17.)

When crank 81 is moved clockwise upon movement of detent 76 to clutch disengaging position, lug 81a of the crank will engage step 163a, thereby moving arm 163 toward the rear and rocking transmission plate 158 counterclockwise. Crank plate 157 will be restrained from movement with plate 158 by arm 166 and therefore spring 160 will be tensioned. Upon conclusion of the carriage shift and the consequent resetting of toggle 31—32, crank 167 and arm 166 will be restored counterclockwise, thereby releasing crank plate 157. Therefore, released plate 157 will be moved in counterclockwise (Fig. 18) direction by spring 160. Counterclockwise movement of plate 157 will move link 162 toward the front of the machine and pin 162' thereof will move latch 110 counterclockwise to initiate the division program in accordance with the referred to copending application, Serial No. 8,548, now Patent 2,531,207.

It will be noted that plate 157 is provided with a cam edge to the rear of slot 157' for the purpose of positively guiding arm 166 into engagement with the slot. Upon counterclockwise movement of plate 157, arm 166 will be moved upwardly by the cam edge which movement is allowed by the yield of the spring of the arm. Furthermore, upon counterclockwise movement of plate 157, stud 161 thereon will engage the extension of plate 158 and the inertia of the parts will afford a slight further counterclockwise movement of the parts, including plate 158. Therefore, arm 163 will be moved a slight distance further to the rear, thereby moving step 163a from engagement with stud 81a. Pin 163' in the rearward movement of arm 163 will have been moved from the forward slot portion to the rear downwardly extending portion of opening 164' of lever 164. Arm 163 released from frictional restraint by engagement of step 163a with stud 81a and from the slot portion of opening 164' will be free to drop by gravity to the position shown in Fig. 18.

Divide key 128 is held alternatively in its retracted and depressed positions by a toggle spring (not shown). The division program is terminated upon automatic retraction of divide key 128 upon shifting of the carriage into its leftmost position or retraction of the divide key by manual depression of a stop key (not shown). These operations, however, bear no relation to the invention and are fully disclosed in the aforenoted application, Serial No. 8,548, now Patent 2,531,207.

Upon retraction of divide key 128, link 134 will be moved toward the rear and pin 134a thereof will depress lever 164 to normal. Stud 134' on link 134 will engage the rear of the slot in link 162, thereby moving said link 162 toward the rear of the machine and plates 157—158 as a unit clockwise to normal. Upon clockwise movement of plate 158, arm 163 will be moved forwardly and pin 163' thereof will ride upwardly on the inclined forward edge of the downwardly extending portion to the slotted portion of opening 164', thereby locating the arm in its normal position, as shown in Fig. 16. Pin 162' upon rearward movement with link 162 will permit resetting of latch arm 110 and also effect other adjustments (not shown) which will terminate the division program. Pin 162' is related to the division controlling mechanism in the same manner as pin 722' of the aforenoted copending application, No. 8,548, now Patent 2,531,207, to which reference has been made for the operation of the division program.

Disablement of carriage shift initiating means

If divide key 128 is depressed with the carriage in its rightmost position, the clearing operation of clutch 75 will be ineffective to initiate operation of the carriage shifting mechanism and the main clutch engaging mechanism will be operated without delay by movement of auxiliary clutch detent 76 to clutch disengaging position. The means operable to disable the carriage shift initiating mechanism comprises stop 146 and lever 147 (Figs. 11 and 15).

Stop 146 is mounted on the right end of a slide 168 which extends outwardly from the right side frame. Slide 168 extends across the machine and also extends outwardly from the left side frame. When the carriage is in any of its intermediate positions, slide 168 and stop 146 are yieldably located in a centralized position (Fig. 15) by a pair of spring centralizing devices 169. The end of the rearward arm of lever 147 extends between a pair of depending fingers of stop 146 and when the stop is in centralized position lever 147 is permitted movement in either direction. However, when the carriage is in its rightmost position, a lug 170 on the inner face of the left end plate of the carriage will engage and displace slide 168 and stop 146 to the right. In this position of stop 146, a lug at the end of the left finger thereof will be moved beneath the rear arm of lever 147 thus blocking the lever from clockwise movement. Therefore, when rocker 144 is released by lever 146 upon depression of the divide key, the lower end of spring 145 will be restrained from forward movement by lever 147 and will thus be ineffective to move rocker 144 counterclockwise. Arm 153 therefore will not be displaced laterally and will be ineffective to initiate operation of the carriage shift mechanism upon operation of auxiliary clutch 75. Upon conclusion of the clearing operation of clutch 75, latch arm 151 will release lever 146 to reengage recess 146' with rocker 144 as previously described.

Latch arm 166 (Fig. 16) is normally ineffective to restrain crank plate 157. Therefore, as arm 163 is moved to the rear by crank 81, plates 157—158 will be moved counterclockwise as a unit thereby moving link 162 forwardly to cause operation of the main clutch engaging mechanism without delay. It will be recalled that there is a slight reverse movement of detent 76 after its clockwise movement to disengage clutch 75. This reverse movement will move stud 81a of crank 81 from engagement with step 163a of arm 163 thereby permitting downward movement of the arm by gravity to the position shown in Fig. 18.

Disablement of register clearing and carriage shift initiating mechanisms

Manual setting latch 129 to clockwise position as shown in Fig. 2 provides for the disablement of the means to connect the register clearing mechanism with clutch 75 and also to render the operation of the clutch ineffective to institute a carriage shift as follows:

Upon counterclockwise movement (Fig. 10) of lever 138, latch 129 will prevent like movement of lever 130. Finger 141 of lever 130 will therefore be ineffective to move slide 89 to the left to engage the clearing train. Lever 146 (Fig. 11) will be moved to release rocker 144. However, crank 99 (Fig. 9) connected to slide 89 will not be moved. Therefore, lever 152 will be held in clockwise position thereby maintaining latch 151 in disabled position. Lever 138 is restored during the first half cycle of clutch 75 and before arm 153 (Figs. 11 and 12) is rocked above pins 13'—14' of shift keys 13—14. Rocker 144 is permitted very little movement upon release until arm 153 is raised above pins 13'—14'. Thus, lever 146 will be restored to reengage recess 146' with rocker 144 to permit idle downward movement of arm 153 between pins 13'—14'. The main clutch engagement therefore will be effected directly by operation of auxiliary clutch 75 without a register clearing operation and without the interposition of a carriage shift, regardless of the position of the carriage.

Although the invention has been disclosed in the control of particular ancillary operations in conjunction with the institution of a program of division, it will be apparent that the invention is equally applicable where it is desired to effect the sequential control of other clutch driven operations in a calculating machine. It will be understood therefore that the invention is not to be restricted, except as necessitated by the spirit of the appended claims.

I claim:

1. In a motor driven calculating machine having a first cyclically operable clutch mechanism, a member movable to control the engagement and disengagement thereof, a second clutch mechanism, and a member movable to control the engagement of said second clutch mechanism; an operating member, means operable upon movement of said operating member to move said first clutch control member to clutch engaging position, a member driven by said first clutch mechanism for moving the control member thereof to clutch disengaging position, and a power transmission train operable to move said second clutch control member to clutch engaging position in response to movement of said first clutch control member to clutch disengaging position.

2. In a motor driven calculating machine having a first cyclically operable clutch mechanism, a member movable to control the engagement and disengagement thereof, a second clutch mechanism, and a member movable to control the engagement of said second clutch mechanism; a power transmission train operable to move said second clutch control member to clutch engaging position including an element adjustable into driven relation with said first clutch control member, an operating member, means operable upon movement of said operating member to move said first clutch control member to clutch engaging position and said adjustable element into driven relation with said control member, and a member driven by said first clutch mechanism for moving the control member thereof to clutch disengaging position thereby moving said second clutch control member to clutch engaging position.

3. In a motor driven calculating machine having a first cyclically operable clutch mechanism, a member movable to control the engagement and disengagement thereof, a second clutch mechanism, a member movable to control the engagement of said second clutch mechanism, a driving member driven by said first clutch mechanism, operating connections adjustable into driven engagement with said driving member, and a mechanism operable by said operating connections; an operating member, power means operable upon movement of said operating member to move said first clutch control member to clutch engaging position and to adjust said operating connections into driven engagement with said driving member, a power transmission train operable to move said second clutch control member to clutch engaging position including an adjustable element means operable to adjust said element into driven relation with said first clutch control member upon movement of said operating member, and a member driven by said first clutch mechanism for moving the control member thereof to clutch disengaging position thereby moving said second clutch control member to clutch engaging position.

4. The invention according to claim 3 having latching means manually adjustable to restrain the operating connections from adjustment into driven engagement with the driving member upon operation of the power means.

5. In a motor driven calculating machine having a first cyclically operable clutch mechanism, a member movable to control the engagement and disengagement thereof, a second clutch mechanism, and a member movable to control the engagement of said second clutch mechanism; spring means for urging said first clutch control member to clutch engaging position, a latch for holding said first clutch control member in clutch disengaging position against the tension of said spring means, an operating member, means operable upon movement of said operating member to release said latch, a power transmission train operable to move said second clutch control member to clutch engaging position including an adjustable element, means operable to adjust said element into driven relation with said first clutch control member upon movement of said operating member, and a member driven by said first clutch mechanism for moving the control member thereof to clutch disengaging position thereby moving said second clutch control member to clutch engaging position.

6. In a motor driven calculating machine having a first cyclically operable clutch mechanism, a member movable to control the engagement and disengagement thereof, a second clutch mechanism, a member movable to control the engagement of said second clutch mechanism, a driving member driven by said first clutch mechanism, operating connections adjustable into driven engagement with said driving member, and a mechanism operable by said operating connections; a pair of members respectively operable to cause movement of said first clutch control member to clutch engaging position and to adjust said operating connections into driven engagement with said driving member, spring means for operating said pair of members, latching means for holding said pair of members against the tension of said spring means, an operating member including means movable thereby to release said latching means, a power transmission train including an adjustable element, means operable to adjust said element into driven relation with said first clutch control member upon movement of said operating member, and a member driven by said first clutch mechanism for moving the control member thereof to clutch disengaging position thereby moving said second clutch control member to clutch engaging position.

7. The invention according to claim 6 having a second latching means manually settable to restrain the member for adjusting the operating connections against the tension of the spring means upon release of the first latching means thereby preventing the engagement of the operating connections.

8. In a motor driven calculating machine having a cyclically operable first clutch mechanism, a member movable to control the engagement and disengagement thereof, a second clutch mechanism, and a member movable to control the engagement of said second clutch mechanism; an operating member, means operable upon movement of said operating member to move said first clutch control member to clutch engaging position, a driving member operated by said first clutch control member, a power transmission train operable to move said second clutch control member to clutch engaging position including an adjustable element, means operable to adjust said element into position for engagement by said driving member upon movement of said operating member, and a member driven by said first clutch mechanism for moving the control member thereof to clutch disengaging position thereby moving said second clutch control member to clutch engaging position.

9. In a motor driven calculating machine having a first cyclically operable clutch mechanism, a member movable to control the engagement and disengagement thereof, a second clutch mechanism, and a member movable to control the engagement of said second clutch mechanism; an operating member, means operable to move said first clutch control member to clutch engaging position upon movement of said operating member, a driving member operated by said first clutch control member, a power transmission train operable to move said second clutch control member to clutch engaging position including an adjustable element, spring means for moving said adjustable element into driven engagement with said driving member, a blocking member normally restraining said adjustable element from engagement with said driving member, and movable to release said adjustable element upon movement of said operating member and a member driven by said first clutch mechanism to move the control member thereof to clutch disengaging position thereby moving said second clutch control member to clutch engaging position.

10. In a motor driven calculating machine having a first cyclically operable clutch mechanism, a member movable to control the engagement and disengagement thereof, a second clutch mechanism, a member movable to control the engagement of said second clutch mechanism, a denominationally shiftable register carriage, carriage shifting mechanism including a control member movable to initiate the operation, and carriage shift terminating means operable upon movement of said carriage into a given position; an operating member, means operable upon movement of said operating member to move said first clutch control member to clutch engaging position, a first power transmission train including a normally ineffectively positioned operating element adjustable to effective position and thereupon operable to move said shift control member to shift initiating position upon operation of said first clutch mechanism, means operable to adjust said operating element to effective position upon movement of said operating member, a member driven by said first clutch mechanism for moving the control member thereof to clutch disengaging position, a second power transmission train operable to move said second clutch control member to clutch engaging position in response to movement of said first clutch control member to clutch disengaging position including a yieldable coupling, a restraining element adjustable into position to hold the operation of said second transmission train in abeyance upon initiation of a carriage shifting operation, means operable in response to movement of said carriage into said given position to move said restraining element from restraining position, and devices settable upon movement of said carriage into said given position to disable the adjusting means for the operating element of the first said transmission train.

11. The invention according to claim 10 in which the second power transmission train includes a normally ineffectively positioned element adjustable into driven relation with the first clutch control member having means operable upon movement of said operating member to move said adjustable element into driven relation with said first clutch control member.

12. The invention according to claim 10 having a driving member driven by said first clutch mechanism, operating connections adjustable into driven engagement with said driving member, a mechanism operable by said operating connections, and means operable upon movement of the operating member to effect said adjustment of said connections.

HERMAN GANG.

References Cited in the file of this patent

UNITED STATES PATENTS

| Number | Name | Date |
| --- | --- | --- |
| 2,148,760 | Lerch | Feb. 28, 1939 |
| 2,152,199 | Machado | Mar. 28, 1939 |
| 2,227,785 | Kottmann | Jan. 7, 1941 |
| 2,252,621 | Eichler | Aug. 12, 1941 |
| 2,271,240 | Avery | Jan. 27, 1942 |
| 2,333,234 | Boyden et al. | Nov. 2, 1943 |
| 2,399,890 | Pott | May 7, 1946 |
| 2,500,346 | Christian et al. | Mar. 14, 1950 |
| 2,531,207 | Gang | Nov. 21, 1950 |